(12) United States Patent
Fonk et al.

(10) Patent No.: US 12,406,165 B2
(45) Date of Patent: Sep. 2, 2025

(54) TEMPERATURE INDICATOR

(71) Applicant: ShockWatch, Inc., Dallas, TX (US)

(72) Inventors: Anthony N. Fonk, Austin, TX (US); Aldric Lee, Plano, TX (US)

(73) Assignee: ShockWatch, Inc., Dallas, TX (US)

( * ) Notice: Subject to any disclaimer, the term of this patent is extended or adjusted under 35 U.S.C. 154(b) by 634 days.

(21) Appl. No.: 17/652,387

(22) Filed: Feb. 24, 2022

(65) Prior Publication Data

US 2022/0180139 A1 Jun. 9, 2022

Related U.S. Application Data

(63) Continuation of application No. 16/263,768, filed on Jan. 31, 2019, now Pat. No. 11,263,504.

(60) Provisional application No. 62/917,398, filed on Dec. 6, 2018, provisional application No. 62/709,839, filed on Feb. 1, 2018.

(51) Int. Cl.
| | |
|---|---|
| *G06K 19/07* | (2006.01) |
| *G01K 1/024* | (2021.01) |
| *G01K 3/04* | (2006.01) |
| *G01K 11/00* | (2006.01) |
| *G01K 11/06* | (2006.01) |

(52) U.S. Cl.
CPC ......... *G06K 19/0717* (2013.01); *G01K 1/024* (2013.01); *G01K 3/04* (2013.01); *G01K 11/06* (2013.01)

(58) Field of Classification Search
CPC ........ G06K 19/0717; G01K 1/24; G01K 3/04; G01K 11/06

USPC .......................................................... 116/216
See application file for complete search history.

(56) References Cited

U.S. PATENT DOCUMENTS

| | | | | | |
|---|---|---|---|---|---|
| 3,603,953 | A | * | 9/1971 | Lindberg | G08B 17/06 340/592 |
| 3,621,384 | A | * | 11/1971 | Yamada | H02H 3/046 324/529 |
| 3,813,578 | A | * | 5/1974 | Tiffany | H02H 9/008 361/88 |
| 4,017,728 | A | * | 4/1977 | Audesse | G03B 15/0457 362/13 |

(Continued)

FOREIGN PATENT DOCUMENTS

| | | | |
|---|---|---|---|
| CN | 101833288 A | * | 9/2010 |
| JP | H0258615 | * | 4/1990 |

(Continued)

OTHER PUBLICATIONS

17652387_2024-06-10_WO_2013051121_A1_H.pdf Apr. 11, 2013.*

(Continued)

*Primary Examiner* — Randy W Gibson
(74) *Attorney, Agent, or Firm* — Dority & Manning, P.A.

(57) ABSTRACT

A temperature indicator includes a first element, a second element, and circuitry configured to detect whether the first element is in an open circuit condition or a closed circuit condition relative to a contact. Responsive to the indicator being subjected to a temperature exceeding a threshold, the second element changes in a size thereof to cause a change in engagement between the first element and the contact. The circuitry is configured to output a value based on whether the first element and the contact are in the open circuit condition or the closed circuit condition.

20 Claims, 5 Drawing Sheets

(56) References Cited

U.S. PATENT DOCUMENTS

| | | | | |
|---|---|---|---|---|
| 4,276,532 A | * | 6/1981 | Aoki | H01H 37/765 337/407 |
| 4,464,641 A | * | 8/1984 | Bellows | H01H 71/40 335/37 |
| 4,827,374 A | * | 5/1989 | Dunn | H01H 31/122 361/617 |
| 4,907,119 A | * | 3/1990 | Allina | H02H 9/042 361/111 |
| 4,965,545 A | * | 10/1990 | Johnson | F03G 7/065 60/527 |
| 5,262,748 A | * | 11/1993 | Tsung-Mou | H01H 73/26 D13/160 |
| 5,539,371 A | * | 7/1996 | Yu | H01H 71/7427 337/67 |
| 5,977,858 A | * | 11/1999 | Morgen | H01H 61/0107 60/527 |
| 6,042,264 A | | 3/2000 | Prusik et al. | |
| 6,222,438 B1 | * | 4/2001 | Horibe | H01H 85/06 337/296 |
| 6,477,025 B1 | * | 11/2002 | Goldbach | H05K 9/0066 338/21 |
| 6,734,781 B1 | * | 5/2004 | Nagashima | H01H 37/761 337/159 |
| 10,697,837 B2 | * | 6/2020 | Nemet | G01K 11/12 |
| 11,263,504 B2 | * | 3/2022 | Fonk | G06K 19/0717 |
| 11,994,434 B2 | * | 5/2024 | Fonk | G01K 11/06 |
| 2001/0020888 A1 | * | 9/2001 | Schon | H01H 85/46 337/142 |
| 2002/0011915 A1 | * | 1/2002 | Niino | H01H 37/5436 337/53 |
| 2002/0158609 A1 | * | 10/2002 | Lavington | H02J 7/00309 320/165 |
| 2007/0052063 A1 | * | 3/2007 | Ueda | H01L 23/5256 257/E23.149 |
| 2009/0097528 A1 | * | 4/2009 | Simon, III | G01K 11/06 374/E11.006 |
| 2011/0003279 A1 | | 1/2011 | Patel | |
| 2011/0163850 A1 | | 7/2011 | Bachman et al. | |
| 2014/0209692 A1 | | 7/2014 | Ozaki | |
| 2015/0235121 A1 | * | 8/2015 | Pavate | G06K 19/07783 235/492 |
| 2016/0169713 A1 | | 6/2016 | Graff et al. | |
| 2016/0171261 A1 | | 6/2016 | Alarcon Ramos et al. | |
| 2016/0278168 A1 | | 9/2016 | Bourke, III et al. | |
| 2016/0290871 A1 | | 10/2016 | Kozono et al. | |
| 2016/0364642 A1 | | 12/2016 | Viala et al. | |
| 2018/0062374 A1 | * | 3/2018 | Yang | H01C 1/08 |
| 2022/0129723 A1 | * | 4/2022 | Roth | G06K 19/0723 |
| 2024/0310221 A1 | * | 9/2024 | Fonk | G01K 11/06 |

FOREIGN PATENT DOCUMENTS

| | | | | |
|---|---|---|---|---|
| JP | 2007535094 A | * | 11/2007 | |
| JP | 2011216221 | | 10/2011 | |
| JP | 5723474 | | 5/2015 | |
| JP | 5723474 B1 | * | 5/2015 | B32B 7/12 |
| WO | 2006048412 | | 5/2006 | |
| WO | WO-2013051121 A1 | * | 4/2013 | G06K 19/0715 |
| WO | WO-2017110571 A1 | * | 6/2017 | G06K 19/02 |
| WO | WO-2018016624 A1 | * | 1/2018 | G06K 19/077 |

OTHER PUBLICATIONS

17652387_2024-06-10_WO_2017110571_A1_H.pdf,Jun. 29, 2017.*
17652387_2024-06-10_WO_2018016624_A1_H.pdf,Jan. 25, 2018.*
17652387_2024-06-20_JP_2007535094_A_H.pdf,Nov. 29, 2007.*
17652387_2024-06-20_CN_101833288_A_H.pdf,Sep. 15, 2010.*
17652387_2024-06-24_JP_H0258615_U_H.pdf,Apr. 26, 1990.*
17652387_2024-06-24_JP_5723474_B1_H.pdf,May 27, 2015.*
Sensitech Inc.; TempTale Ultra Product Data Sheet; Nov. 2017.
Axzon (Formerly RFMicron); RFM3200 Wireless Temperature Sensor Product Data Sheet; Nov. 2016.
Shockwatch, Inc.; WarmMark Temperature Indicator Product Technical Data Sheet; Jun. 2014.
International Search Report and Written Opinion; International Application No. PCT/US2019/016043; May 17, 2019.

* cited by examiner

TEMPERATURE INDICATOR

BACKGROUND

During manufacturing, storage, or transit, many types of objects need to be monitored or tracked due to the temperature sensitivity or fragility of the objects. For example, some types of objects may be susceptible to damage if exposed to certain temperatures (e.g., food or pharmaceutical items). Thus, for quality control purposes and/or the general monitoring of transportation conditions, it is desirable to determine and/or verify the environmental conditions to which the object has been exposed.

BRIEF SUMMARY

According to one aspect of the present disclosure, a device and technique for temperature detection is disclosed. The temperature indicator a first element, a second element, and circuitry configured to detect whether the first element is in an open circuit condition or a closed circuit condition relative to a contact. Responsive to the indicator being subjected to a temperature exceeding a threshold, the second element changes in a size thereof to cause a change in engagement between the first element and the contact. The circuitry is configured to output a value based on whether the first element and the contact are in the open circuit condition or the closed circuit condition.

According to another embodiment of the present disclosure, a temperature indicator includes a housing affixable to an object where the housing has a contact, a first element movable relative to the contact, a second element configured to cause the first element to move relative to the contact, and circuitry configured to detect an engagement condition of the first element relative to the contact. Responsive to the indicator being subjected to a temperature exceeding a threshold, the second element changes in size to thereby cause movement of the first element relative to the contact to change the engagement condition between the first element and the contact, and wherein the circuitry is configured to output a value based on the engagement condition.

According to yet another embodiment of the present disclosure, a temperature indicator includes a contact, a first element movable from a first position to a second position relative to the contact, circuitry coupled to the first element and the contact where the circuitry is configured to detect whether the first element and the contact are in an open circuit condition or a closed circuit condition, and a second element configured to change in a size thereof to cause movement of the first element from the first position to the second position in response to the indicator being subjected to a particular temperature. The first element is prevented from returning from the second position to the first position.

BRIEF DESCRIPTION OF THE SEVERAL VIEWS OF THE DRAWINGS

For a more complete understanding of the present application, the objects and advantages thereof, reference is now made to the following descriptions taken in conjunction with the accompanying drawings, in which.

DETAILED DESCRIPTION

Embodiments of the present disclosure provide a device and technique for temperature detection and indication. According to one embodiment, a temperature indicator includes a housing having a temperature detection assembly, switch circuitry, and a radio-frequency identification (RFID) module coupled to the switch circuitry. Responsive to the indicator being subjected to a temperature exceeding a threshold, the temperature detection assembly causes a change in the switch circuitry, wherein the change in the switch circuitry causes a change in a value output by the RFID module when activated. Embodiments of the present disclosure enable temperature event detection using no internal power supply. For example, a temperature-sensing assembly or mechanism closes or opens switch circuitry in response to detecting a particular temperature event. The RFID module can detect the state of the switch circuitry and emit or output a particular value based on whether the switch circuitry is in a closed or open condition. Thus, for example, an RFID reader can be used to activate the RFID module and determine an activation status of the temperature indicator device. Embodiments of the present disclosure provide a temperature indicator that is readily affixable to a container or the like so as to provide at least an indication when a particular container or component has been subjected to a particular environmental temperature. Embodiments of the present disclosure also provide a temperature indicator that is an irreversible, "go-no go" device for indicating that a predetermined temperature has been experienced by the indicator.

Figure 1:
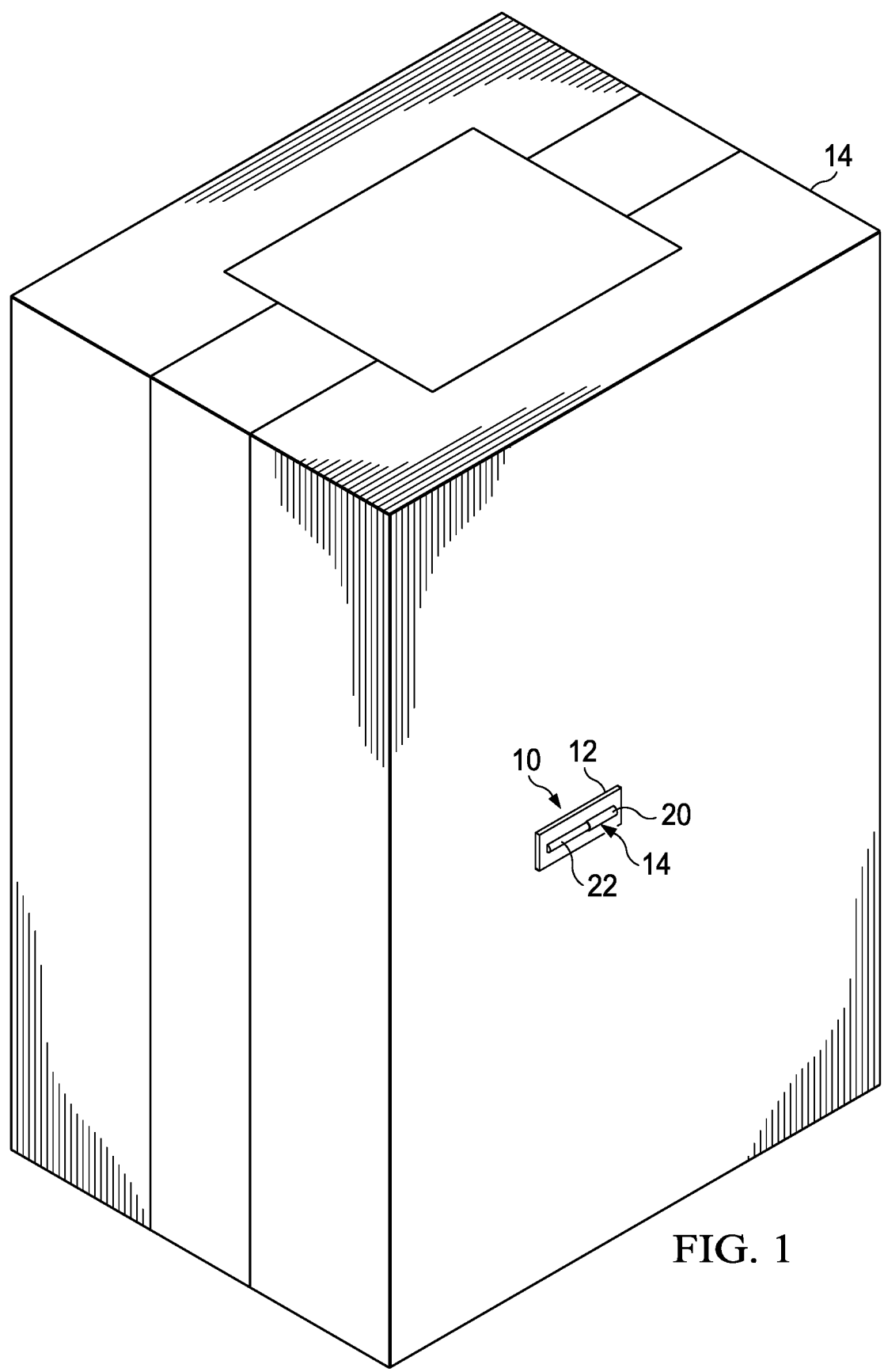
FIG. 1 is a diagram illustrating an application of an embodiment of a temperature indicator according to the present disclosure.

With reference now to the Figures and in particular with reference to FIG. 1, exemplary diagrams of a temperature indicator 10 are provided in which illustrative embodiments of the present disclosure may be implemented. FIG. 1 is a diagram illustrating a front view of temperature indicator 10. In FIG. 1, indicator 10 is a portable device configured to be affixed to or disposed within a transport container containing an object of which temperature events associated therewith are to be monitored. Embodiments of temperature indicator 10 monitor whether an object has been exposed to a particular temperature or environment during manufacturing, storage and/or transport of the object. In some embodiments, temperature indicator 10 may be affixed to a transport container using, for example, adhesive materials, permanent or temporary fasteners, or a variety of different types of attachment devices. The transport container may include a container in which a monitored object is loosely placed or may comprise a container of the monitored object itself. It should be appreciated that FIG. 1 is only exemplary and is not intended to assert or imply any limitation with regard to the environments in which different embodiments may be implemented.

In the embodiment illustrated in FIG. 1, temperature indicator 10 comprises a housing 12 having a temperature sensing, temperature-sensitive and/or temperature detection assembly 14 disposed therein. In the illustrated embodiment, detection assembly 14 is configured to detect and indicate temperature events relative to indicator 10 (e.g., detecting when indicator 10 (and correspondingly, a container to which indicator 10 is associated with) has been subjected to a particular environmental temperature). In some embodiments, housing 12 is configured and/or constructed from a clear or semi-opaque material having a masking label 20 located on a front side thereof or affixed thereto. In some embodiments, masking label 20 is configured having one or more apertures or "windows" 22 for providing a visual indication of temperature detection. For example, in some embodiments, in response to indicator 10 being subjected to a particular temperature, detection assembly 14 causes a visual indication to be displayed within or through one or more of windows 22 to provide a visual indication that the monitored object has or may have been subjected to some level of temperature. However, it should be understood that other methods may be used to provide a visual indication that detection assembly 14 has moved and/or been otherwise placed into an activated state indicating that indicator 10 has experienced some level of temperature. It should also be understood that housing 12 may be configured and/or manufactured from other materials (e.g., opaque materials having one or more windows 22 formed therein). In some embodiments, housing 12 may be configured without window 22. For example, as will be described in greater detail below, indicator 10 may be configured to provide visual and/or non-visual indications of whether a temperature condition has been experienced by indicator 10 (e.g., via the use of RFID signals).

Figure 2:
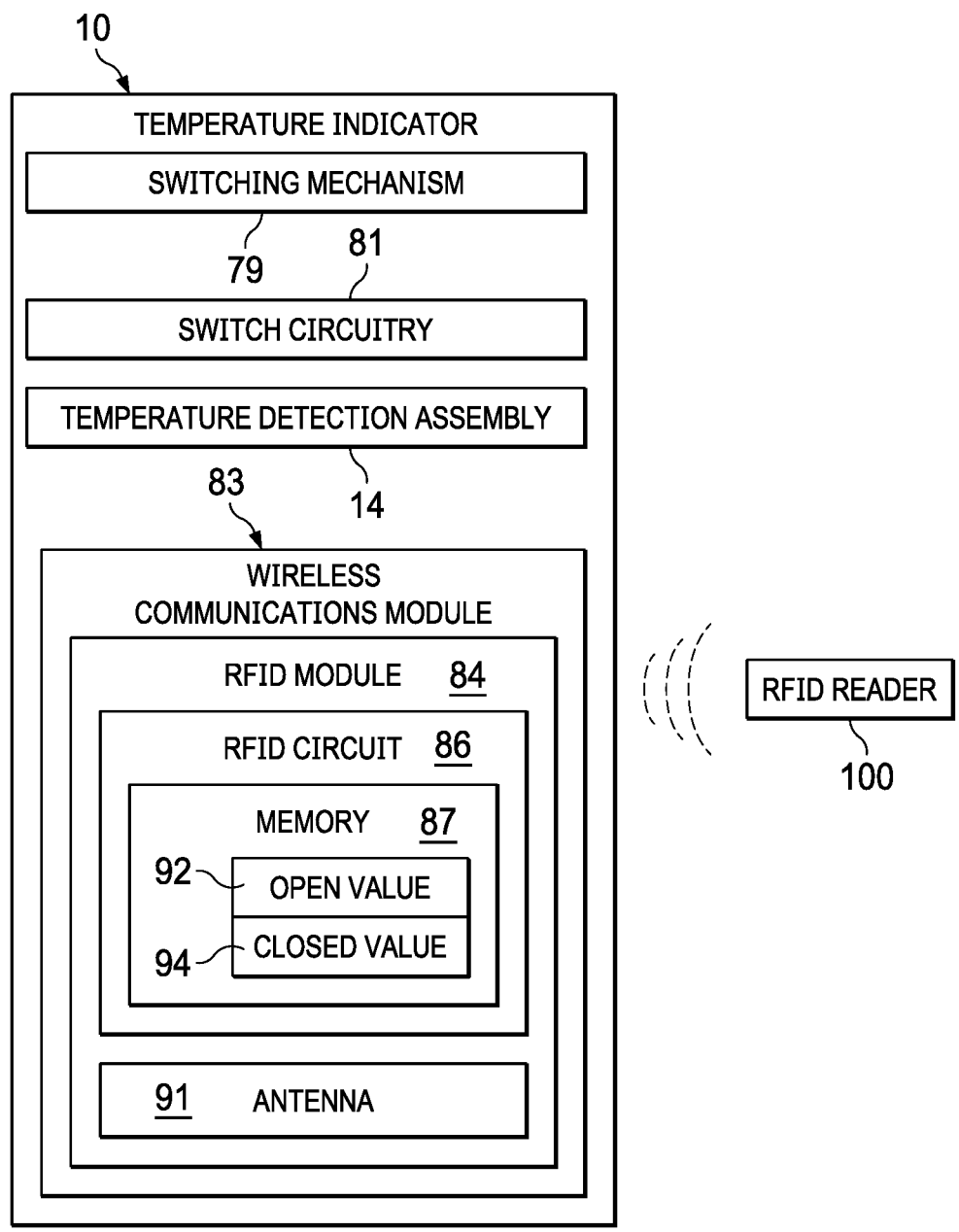
FIG. 2 is a block diagram illustrating an embodiment of a temperature indicator according to the present disclosure.

FIG. 2 is a block diagram representing and illustrating an embodiment of indicator 10 in accordance with an embodiment of the present disclosure. In some embodiments, temperature indicator 10 may be affixed (permanently or removably) to a printed circuit board and/or otherwise permanently or removably connected to electronic circuitry (e.g., such as a removable cartridge) such that, in response to receipt and/or detection of a temperature condition of a sufficient magnitude and/or exceeding a particular threshold(s), temperature indicator 10 provides an electronic switch closure or opener that may thereby provide an electronic signal/indication of such event. In FIG. 8, indicator 10 includes a switching mechanism 79, switch circuitry 81, a wireless communications module 83 coupled to switch circuitry 81, and temperature detection assembly 14 coupled to switching mechanism 79. Switching mechanism 79 may be any type of mechanism and/or device used to cause a state change in switch circuitry 81. For example, in some embodiments, mechanism 79 may comprise a metal switch (e.g., a wire or metallic/conductive strip). In such an embodiment (as will be described in greater detail below), temperature detection assembly 14 may cause a state change in switch circuitry 81 (e.g., changing from an open circuit condition to a closed circuit condition, or vice versa) by causing a change to and/or otherwise actuating/activating switching mechanism 79. Switch circuitry 81 may comprise one or more switch elements, contacts, and or circuits that are responsive to a change in switching mechanism 79.

Wireless communications module 83 is configured to wirelessly communicate information associated with a state of switch circuitry 81 indicating the activation state of indicator 10 (e.g., based on an open or closed circuit state of circuitry 81). For example, in one embodiment, wireless communications module 83 includes an RFID module 84. In some embodiments, RFID module 84 comprises a passive RFID module 84 (e.g., a passive RFID tag) having an RFID integrated circuit or circuitry 86 (e.g., disposed on or as part of a printed circuit board) and a memory 87, along with an antenna 91. As a passive RFID module 84, indicator 10 does not contain a battery (e.g., power is supplied by an RFID reader 100). For example, when radio waves from reader 100 are encountered by module 84, antenna 91 forms a magnetic field, thereby providing power to module 84 to energize circuit 86. Once energized/activated, module 84 may output/transmit information encoded in memory 87. However, it should be understood that, in some embodiments, RFID module 84 may comprise an active RFID module 84 including a power source (e.g., a battery) that may be configured to continuously, intermittently, and/or according to programmed or event triggers, broadcast or transmit certain information. It should also be understood that wireless communications module 83 may be configured for other types of wireless communication types, modes, protocols, and/or formats (e.g., short-message services (SMS), wireless data using General Packet Radio Service (GPRS)/3G/4G or through public internet via Wi-Fi, or locally with other radio-communication protocol standards such as Wi-Fi, Z-Wave, ZigBee, Bluetooth®, Bluetooth® low energy (BLE), LoRA, NB-IoT, SigFox, Digital Enhanced Cordless Telecommunications (DECT), or other prevalent technologies). As will be described further below, temperature indicator 10 functions as a temperature fuse such that, in response to encountering a particular temperature (e.g., some temperature exceeding some threshold), an electrically conductive member either opens or closes an electronic switch (e.g., switching mechanism 79). This configuration enables temperature indicator 10 to be used as a passive temperature sensor/indicator that can be used as part of an electronic signal or circuit. In some embodiments, the temperature sensing capabilities/functions of temperature indicator 10 of the present disclosure needs no power while in the monitoring state. When activated, temperature indicator 10 completes or opens an electrical path of a circuit and thus could be integrated into most any electronic monitoring system.

In the illustrated embodiment, memory 87 includes at least two different stored and/or encoded values 92 and 94. For example, value 92 may correspond to a value outputted/transmitted by module 84 when switch circuitry 81 is in an open circuit condition or state, and value 94 may correspond to a value outputted/transmitted by module 84 when switch circuitry 81 is in a closed circuit condition or state. As an example, the value 94 may represent an RFID tag identification (ID) number not having an activated temperature switch circuitry 81, and the RFID tag's ID number may have an additional character (e.g., "0") placed at the end thereof. Value 92 may represent the RFID ID number having an activated temperature switch circuitry 81, and the RFID tag's ID number may have an additional character at the end thereof being different from the additional character carried by value 94 (e.g., "1"). In the illustrated embodiment, RFID module 84 (e.g., circuitry 86) is coupled to switch circuitry 81 and can detect whether switch circuitry 81 is in an open or closed circuit condition or state. Thus, for example, switch circuitry 81 may initially be in closed circuit condition or state. Thus, if energized/activated, module 84 would transmit value 94 to reader 100. If indicator 10 were to be subject to a temperature event (e.g., an environmental temperature exceeding some threshold), mechanism 79 may cause a change in circuitry 81 that would result in circuitry 81 being in an open circuit condition or state. Thus, if now energized/activated (e.g., after the temperature event), module 84 would instead transmit value 92 to reader 100. Thus, embodiments of the present invention enable indicator 10 to monitor sensitive products/objects to which it is attached for potential damage caused by temperature conditions using electronic indicators (e.g., RFID readers) while indicator 10 does not contain or require any internal power source (e.g., a battery).

The present invention may include computer program instructions at any possible technical detail level of integration (e.g., stored in a computer readable storage medium (or media) (e.g., memory 87) for causing a processor to carry out aspects of the present invention. Computer readable program instructions described herein can be downloaded to respective computing/processing devices (e.g., communications module 83 and/or RFID module 84). Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages. In some embodiments, electronic circuitry (e.g., circuitry 86) including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention. Aspects of the present invention are described herein with reference to illustrations and/or block diagrams of methods and/or apparatus according to embodiments of the invention. It will be understood that each block of the illustrations and/or block diagrams, and combinations of blocks in the illustrations and/or block diagrams, may represent a module, segment, or portion of code, can be implemented by computer readable program instructions. These computer readable program instructions may be provided to a processor or other programmable data processing apparatus to produce a machine, such that the instructions, which execute via the processor, create means for implementing the functions/acts specified in the illustrations and/or block diagram block or blocks. These computer readable program instructions may also be stored in a computer readable storage medium that can direct a computing device, a programmable data processing apparatus, and/or other devices to function in a particular manner, such that the computer readable storage medium having instructions stored therein comprises an article of manufacture including instructions which implement aspects of the function/act specified in the illustrations and/or block diagram block or blocks. Switch circuitry 81, wireless communications module 83, and/or RFID module 84 may be implemented in any suitable manner using known techniques that may be hardware-based, software-based, or some combination of both. For example, switch circuitry 81, wireless communications module 83, and/or RFID module 84 may comprise software, logic and/or executable code for performing various functions as described herein (e.g., residing as software and/or an algorithm running on a processor unit, hardware logic residing in a processor or other type of logic chip, centralized in a single integrated circuit or distributed among different chips in a data processing system). As will be appreciated by one skilled in the art, aspects of the present disclosure may be embodied as a system, method or computer program product. Accordingly, aspects of the present disclosure may take the form of a hardware embodiment, a software embodiment (including firmware, resident software, microcode, etc.) or an embodiment combining software and hardware aspects that may all generally be referred to herein as a "circuit," "module" or "system."

Figure 3A:
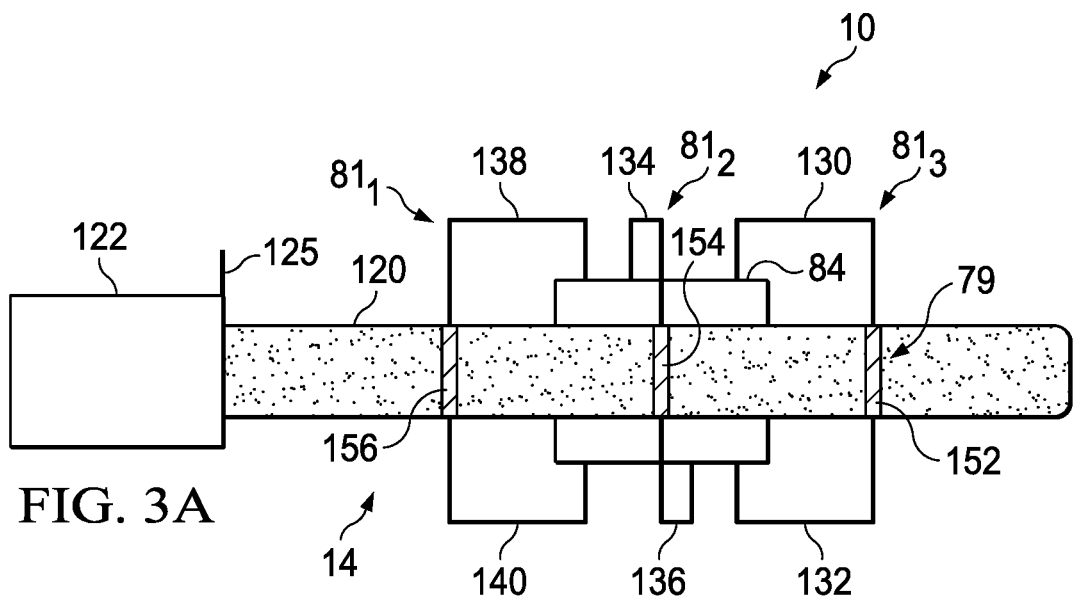
FIG. 3A is a diagram illustrating an embodiment of a temperature indicator in accordance with the present disclosure in an unactivated state.
Figure 3B:
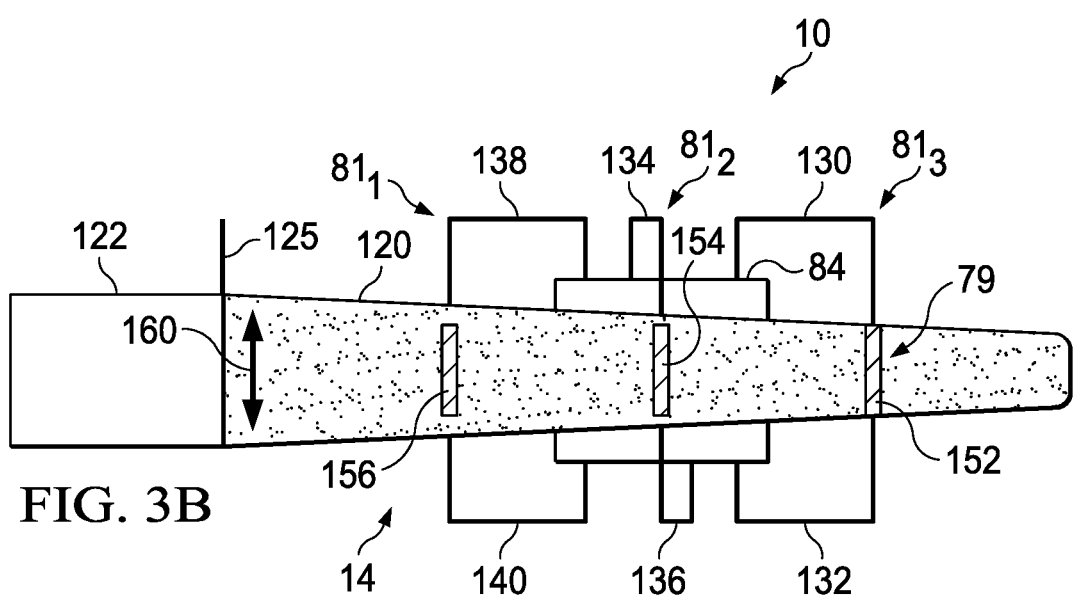
FIG. 3B is a diagram illustrating the temperature indicator of FIG. 3A in accordance with the present disclosure in an activated state.

FIG. 3A is a diagram illustrating an embodiment of indicator 10 in accordance with the present disclosure prior to activation (e.g., prior to detecting a particular temperature or time-temperature event), and FIG. 3B is a diagram illustrating an embodiment of indicator 10 in accordance with the present disclosure after activation (e.g., after detecting a particular temperature or time-temperature event). In the embodiment illustrated in FIGS. 3A and 3B, detection assembly 14 includes an absorbent element 120 and a meltable substance 122. Absorbent element 120 may include any type of material or matter that may absorb substance 122 such that absorbent element 120 swells or increases in size as substance 122 wicks into element 120. For example, absorbent element 120 may include sponges, hydromorphic materials, expanding plastics available from Industrial Polymer Corporation, and certain cellulosic or fiber-based wicking and swelling materials. Substance 122 may be any type of substance or matter that melts at known or desired time-temperature parameters. For example, substance 122 may include a fatty acid material in the Warm Mark® product from SpotSee of Dallas, Tex.

In the embodiment illustrated in FIGS. 3A and 3B, indicator 10 includes a movable barrier 125. In FIG. 3A, barrier 125 is located between element 120 and substance 122 such that indicator 10 is in an unarmed state. For example, in some embodiments, substance 122 may be contained within an enclosure or otherwise maintained such that the only migration path for substance 122 if substance 122 melts is toward element 120. Thus, in such an embodiment, if indicator 10 is subject to a temperature that would otherwise activate indicator 10 before indicator 10 is armed, substance 122 would be prevented from contacting and/or wicking into element 120. In FIG. 3B, barrier 125 has been moved and/or withdrawn from being between element 120 and substance 122, thereby arming indicator 10, such that substance 122 is in contact with and/or in close proximity to element 120. Thus, in the armed state, if indicator 10 is subject to a temperature that would activate indicator 10, substance 122 can migrate to and/or into absorbent element 120 should certain time-temperature parameters be met. In operation, before meltable substance 122 has been exposed to certain time-temperature parameters, meltable substance 122 remains in a solid state and does not migrate onto or into absorbent element 120 (even with barrier 125 removed from between them).

In the embodiment illustrated in FIGS. 3A and 3B, switch circuitry 81 includes switch elements 130, 132, 134, 136, 138, and 140 each coupled or connected to RFID module 84. In the illustrated embodiment, switching mechanism 79 includes contacts 152, 154, and 156. In the embodiment illustrated in FIGS. 3A and 3B, contacts 152, 154, and 156 are spaced apart from each other and are spaced apart from substance 122 by varying distances. In FIG. 3A, in the unactivated state of indicator 10, elements 130 and 132 are connected to contact 152, elements 134 and 136 are connected to contact 154, and elements 138 and 140 are connected to contact 156. In this particular embodiment, switch circuitry 81 includes three separate circuits $81_1$, $81_2$, and $81_3$ each in a closed state or closed circuit condition (e.g., elements 130 and 132 and contact 152 forming a first circuit $81_1$; elements 134 and 136 and contact 154 forming a second circuit $81_2$; and elements 138 and 140 and contact 156 forming a third circuit $81_3$). It should be understood that the number of different circuits forming switch circuitry 81 may vary. Switch elements 130, 132, 134, 136, 138, and 140, and contacts 152, 154, and 156, may comprise electrically conductive wires, traces, pads, posts, and/or other type of electronic conductive components.

In FIG. 3B, indicator 10 has been subjected to a time and temperature parameter such that substance 122 (all or a portion thereof) has melted, wicked into, and been absorbed by element 120, thereby causing element 120 to swell and/or increase in size (in the direction(s) indicated by arrow 160). As illustrated in FIG. 3B, the time period in which indicator 10 has been exposed to a certain temperature may result in varying degrees of absorption of substance 122 by element 120 such that the amount of swelling of element 120 may vary over time over a length of element 120 (e.g., greater swelling near contact 156 (e.g., closer to an original location of substance 122) than near contact 152). In the illustrated embodiment, the time and temperature parameter has been enough to cause an open circuit condition as to switch elements 134, 136, 138, and 140 while a closed circuit condition still exists as to switch elements 130 and 132. For example, at a particular temperature, substance 122 begins to melt and substance 122 begins to wick into and be absorbed by element 120. As element 120 absorbs a portion of substance 122 over some time period or parameter, element 120 begins to change in size (e.g., element 120 swells), thereby initially causing a break or disconnection between elements 138 and/or 140 with contact 156 (e.g., an open circuit condition in the first circuit $81_1$). After an additional time period or parameter, element 120 absorbs an additional amount of substance 122 thereby causing additional swelling of element 120 toward contact 154 such that the swelling of element 120 causes a break or disconnection between elements 134 and/or 136 with contact 154 (e.g., an open circuit condition in the second circuit $81_2$). In the illustrated embodiment, a time and temperature parameter has not yet reached a value where the third circuit $81_3$ has changed from a closed circuit state to an open circuit state. However, as the time and temperature parameter continues (e.g., some temperature is exceeded for some period of time), all three circuits (e.g., circuits $81_1$, $81_2$, and $81_3$) would change from a closed state to an open state.

Thus, in operation, RFID module 84 detects the open circuit condition of circuitry 81 and outputs or transmits certain values based on such conditions. For example, in this embodiment, RFID module 84 may output a separate value for each of circuits $81_1$, $81_2$, and $81_3$, thereby enabling a determination of a time period in which indicator 10 may have been subjected to some temperature parameter. For example, at a particular moment in time, circuit $81_1$ may be open while circuits $81_2$ and $81_3$ remain closed. At this instant, RFID module 84 may output a value for circuit $81_1$ indicating its open state while outputting different values for circuits $81_2$ and $81_3$ indicating their closed states. However, after an additional time period of being subjected to a particular temperature parameter, element 120 may have expanded or swelled an additional amount by absorbing an additional amount of substance 122 such that both circuits $81_1$ and $81_2$ are open while circuit $81_3$ remains closed. At this later instant in time, RFID module 84 may output a value for circuits $81_1$ and $81_2$ indicating their open state while outputting a different value for circuit $81_3$ indicating its closed state. Thus, embodiments of the present invention enable the indication and/or determination of a time parameter associated with a particular temperature parameter of exposure. RFID module 84 may be configured to cycle through different output values where each value corresponds to a different circuit $81_1$, $81_2$, and $81_3$ (e.g., outputting value 92 or 94 corresponding to each circuit $81_1$, $81_2$, and $81_3$); however, it should be understood that RFID module 84 may be otherwise configured to indicate different conditions corresponding to each circuit $81_1$, $81_2$, and $81_3$ (e.g., outputting a three-digit value where each digit represents the closed or open state of a respective circuit $81_1$, $81_2$, and 813; outputting unique alternate values for each circuit $81_1$, $81_2$, and $81_3$; outputting one of four unique values where a first value would represent having an unactivated indicator 10 (e.g., no time-temperature excursion having been experienced), a second value represents a change in circuit $81i$, a third value represents a change in each of circuits $81_1$ and $81_2$, and a fourth value represents a change in each of circuits $81_1$, $81_2$, and $81_3$). Thus, in operation, when the RFID module 84 is queried, module 84 checks the condition of circuits $81_1$, $81_2$, and $81_3$) and outputs the appropriate or corresponding value(s). Software or code in reader 100 or another application could then parse the value(s) and make a determination as to whether (or to what extent) a time-temperature event has occurred.

In the illustrated embodiment, the expanding or swelling of element 120 causes a circuit connection to be broken or separated (e.g., between elements 138 and/or 140 and contact 156). However, it should be understood that indicator 10 may be otherwise configured. For example, in some embodiments, contacts 152, 154, and 156 may be configured from a frangible conductive material that breaks or separates into one or more pieces as a result of the expansion or swelling of absorbent element 120, thereby causing circuitry 81 (e.g., circuits $81_1$, $81_2$, and $81_3$) to change from a closed state to an open state. In another embodiment, substance 122 may have conductive properties (e.g. infused conductive particles) that close openings in conductive paths. In this embodiment, circuits $81_1$, $81_2$, and $81_3$ may initially be in an open state (e.g., in an unactivated state of indicator 10) such that as substance 122 wicks into element 120 and element 120 expands/swells, element 120 (with substance 122) engages various switching elements 130, 132, 134, 136, 138, and/or 140 to close one or more circuits $81_1$, $81_2$, and $81_3$. In yet another embodiment, switching elements 130, 132, 134, 136, 138, and 140 may initially be spaced apart from respective contacts 152, 154, and 156 (e.g., in an unactivated state of indicator 10) such that as substance 122 wicks into element 120 and element 120 expands/swells, various switching elements 130, 132, 134, 136, 138, and/or 140 move into engagement with respective contacts 152, 154, and 156, thereby changing one or more circuits $81_1$, $81_2$, and $81_3$ from an open state to a closed state (e.g., gaps between switching elements 130, 132, 134, 136, 138, and 140 and respective contacts 152, 154, and 156 as a result of the swelling of element 120).

Figure 4A:
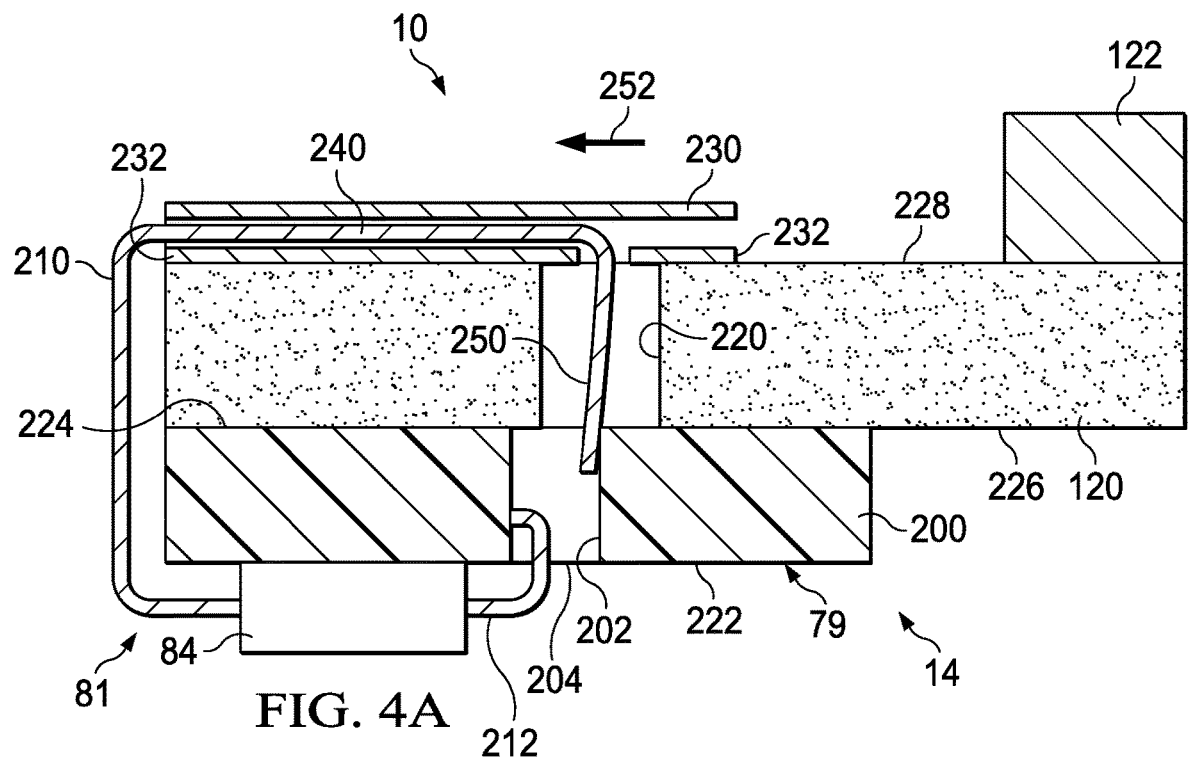
FIG. 4A is a diagram illustrating another embodiment of a temperature indicator in accordance with the present disclosure in an unactivated state.
Figure 4B:
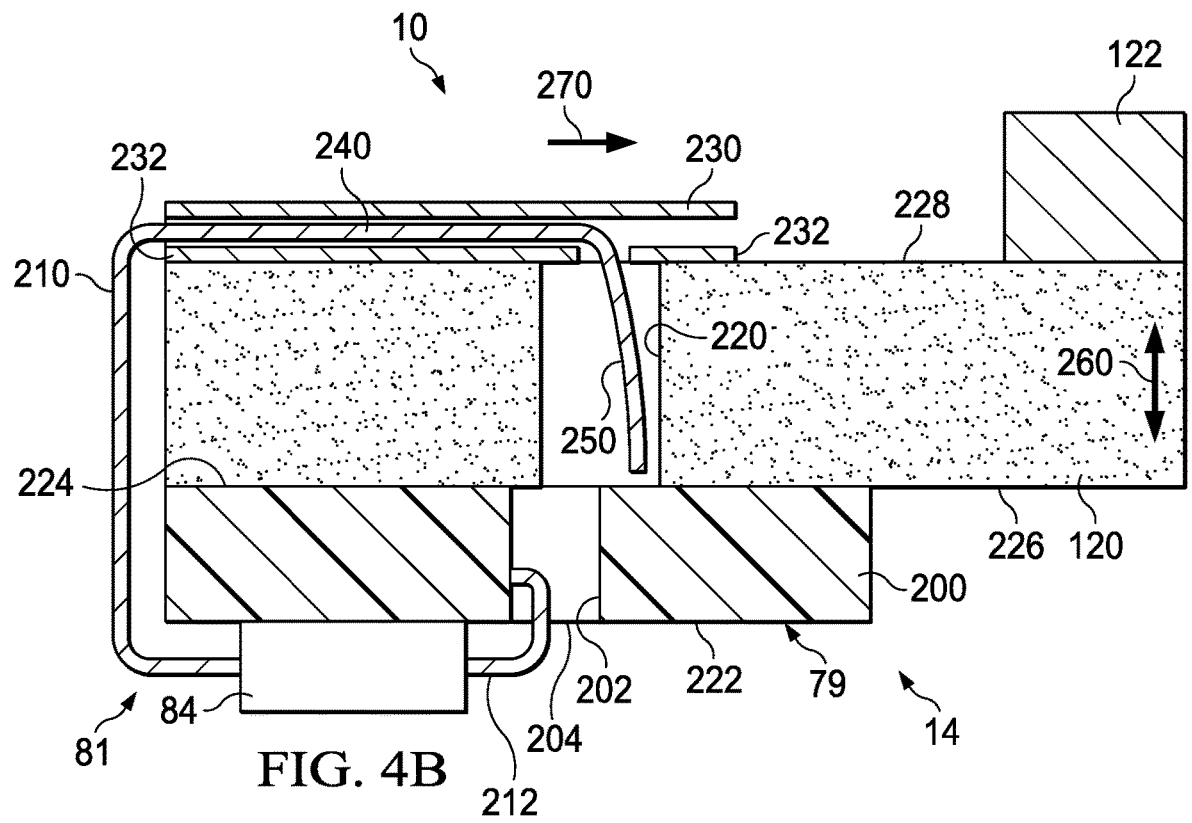
FIG. 4B is a diagram illustrating the temperature indicator of FIG. 4A in accordance with the present disclosure in an activated state.

FIGS. 4A and 4B are diagrams illustrating another embodiment of temperature indicator 10 in accordance with the present disclosure. FIG. 4A is a diagram illustrating an embodiment of indicator 10 in accordance with the present disclosure prior to activation (e.g., prior to detecting a particular temperature or time-temperature event), and FIG. 4B is a diagram illustrating an embodiment of indicator 10 in accordance with the present disclosure after activation (e.g., after detecting a particular temperature or time-temperature event). In the embodiment illustrated in FIGS. 4A and 4B, detection assembly 14 includes absorbent element 120 and meltable substance 122. In the illustrated embodiment, switching mechanism 79 includes a contact member 200 disposed against and/or adjacent to absorbent element 120. In some embodiments, contact member 200 is a printed circuit board (PCB) having a conductive contact 202 in the form of a via 204. For example, contact 202 may include via 204 extending through member 200 and coated with a conductive material. In the illustrated embodiment, RFID module 84 is coupled to member 200 such that member 200 is sandwiched between RFID module 84 and element 120; however, it should be understood that RFID module 84 may be otherwise located.

In the embodiment illustrated in FIGS. 4A and 4B, switch circuitry 81 includes switch elements 210 and 212. Switch element 212 is coupled to RFID module 84 and contact 202 (e.g., one end of element 212 is coupled to RFID module 84 and another end of switch element 212 is coupled to and/or in engagement with contact 202). Switch element 210 is also coupled to RFID module 84. In FIG. 4A (e.g., an unactivated state of indicator 10), element 210 extends around element 120 and extends into and through a via 220 formed in element 120 to engage contact 202 (e.g., one end of switch element 210 coupled to RFID module 84 and another end of switch element 210 extending through via 220 and into engagement with contact 202). For example, in the illustrated embodiment, switch element 212 engages contact 202 from a side or surface 222 of member 200. An opposite side or surface 224 of member 200 (e.g., opposite side 222) is disposed against and/or adjacent a side or surface 226 of element 120. On an opposite side or surface 228 of element 120 (e.g., opposite side 226) are holding members 230 and 232. Holding members 230 and 232 may be tape strips, mounted PCB elements, straps, fasteners, or any other suitable material to retain a portion of switch element 210 adjacent and/or near side 228 of element 120. As illustrated in FIG. 4A, switch elements 210 and 212 engage contact 202 from opposite sides 224 and 222, respectively, of member 200 such that element 120 is disposed between a portion 240 of switch element 210 being held by members 230 and 232 and member 200. Switch elements 210 and 212 and contact 202 may comprise electrically conductive wires, traces, pads, posts, coatings and/or other type of electronic conductive components.

In the embodiment illustrated in FIG. 4A, a distal end 250 of switch element 210 (e.g., and end opposite an end of element 210 coupled to RFID module 84) is biased in a direction indicated by arrow 252 to enable insertion of end 250 into via 204 and into engagement with contact 202. For example, in the illustrated embodiment, vias 204 and 220 may be misaligned or offset from each other (e.g., at least a portion thereof) such that in a free or unbiased state, end 250 is not aligned with via 204. Thus, end 250 of switch element 210 functions similar to a spring element having a mechanical memory such that if end 250 is withdrawn from via 204 (e.g., towards side 228), end 250 returns to an unbiased or free state/position that is misaligned with via 204 (e.g., as depicted in FIG. 4B). As illustrated in FIG. 4A, the biasing of end 250 also ensures engagement between end 250 and contact 202.

Thus, in operation, in an unactivated state (e.g., prior to a time-temperature parameter that would cause substance 122 to melt as depicted in FIG. 4A), switch circuitry 81 is in a closed circuit state or condition as switch elements 210 and 212 are both in engagement with contact 202. In this state, when queried, RFID module 84 transmits value 94 indicating a closed circuit condition, thereby indicating that indicator 10 has yet to be exposed to a time-temperature parameter that would otherwise activate indicator 10. In response to indicator 10 being subjected to some time-temperature parameter that causes substance 122 to melt, substance wicks into and is otherwise absorbed by element 120, thereby causing element 120 to expand or swell (e.g., in the direction(s) indicated by arrow 260). For example, before substance 122 has been exposed to certain time-temperature parameters, substance 122 remains in a solid state and does not migrate into element 120. In some embodiments, a removable arming barrier (e.g., such as barrier 125 depicted in FIGS. 3A and 3B) may be located between substance 122 and element 120 that can be removed to arm indicator 10, thereby enabling indicator 10 to be field activated such that exposures to high temperatures before a time period of interest does not result in substance 122 melting and wicking into element 120.

As illustrated in FIG. 4B, in response to indicator 10 being subjected to some time-temperature parameter that exceeds some threshold that causes substance 122 to melt, thereby also causing element 120 to expand or swell as substance 122 wicks into and is absorbed by element 120, the swelling of element 120 causes end 250 of element 210 to withdraw from via 204 and disengage from contact 202. As a result, a lack of conductive engagement between end 250 of switch element 210 and contact 202 causes circuitry 81 to change from a closed circuit to an open circuit. In this state, when queried, RFID module 84 transmits value 92 indicating an open circuit condition, thereby indicating that indicator 10 has been exposed to a time-temperature parameter that activated indicator 10. In some embodiments, switch element 210 may include additional material, length, or "slack" between RFID module 84 and holding members 230 and 232 to enable the expansion of element 120; however, it should be understood that the connection of switch element 210 with RFID module 84 may be otherwise configured. Additionally, in the embodiment illustrated in FIG. 4B, for ease of illustration and description, element 120 depicts a uniform swelling or expansion over a length of element 120 (e.g., from an end near an initial location of substance 122 to a distal end thereof); however, it should be understood that element 120 change in size in a non-uniform manner over its length as a result of a time parameter in which indicator is subjected to a temperature parameter causing substance 122 to melt.

As illustrated in FIG. 4A, after end 250 of switch element 210 has withdrawn from via 204, end 250 is free to return to an unbiased state (e.g., moving in a direction indicated by arrow 270) due to the stiffness or mechanical shape memory of switch element 210. For example, as element 120 swells, end 250 of switch element 210 moves away from member 200 in a direction along an axis indicated by arrow 260 and, once end 250 exits via 202, end 250 moves in the direction of arrow 270 to its initial unbiased state. In an unbiased state, end 250 of switch element 210 is misaligned with via 202, thereby preventing end 250 from re-entering via 202 should element 120 decrease in size or contract as a result of substance 122 evaporation or otherwise. Thus, embodiments of the present invention provide a non-reversible time-temperature indicator 10.

In the embodiment illustrated in FIGS. 4A and 4B, a single switch element 210 (along with switch element 212 and contact 202) forming a single circuit is depicted; however, it should be understood that indicator 10 could include additional circuits (e.g., similar to circuits $81_1$, $81_2$, and $81_3$ depicted and described in connection with FIGS. 3A and 3B). For example, circuitry similar to element 210 (along with switch element 212 and contact 202) may be replicated and located at varying spacing or intervals along element 120 relative to an initial location of substance 122 such that a time-temperature parameter of exposure may cause different circuits to be closed or open, thereby enabling a time parameter determination associated with the event.

Figure 5A:
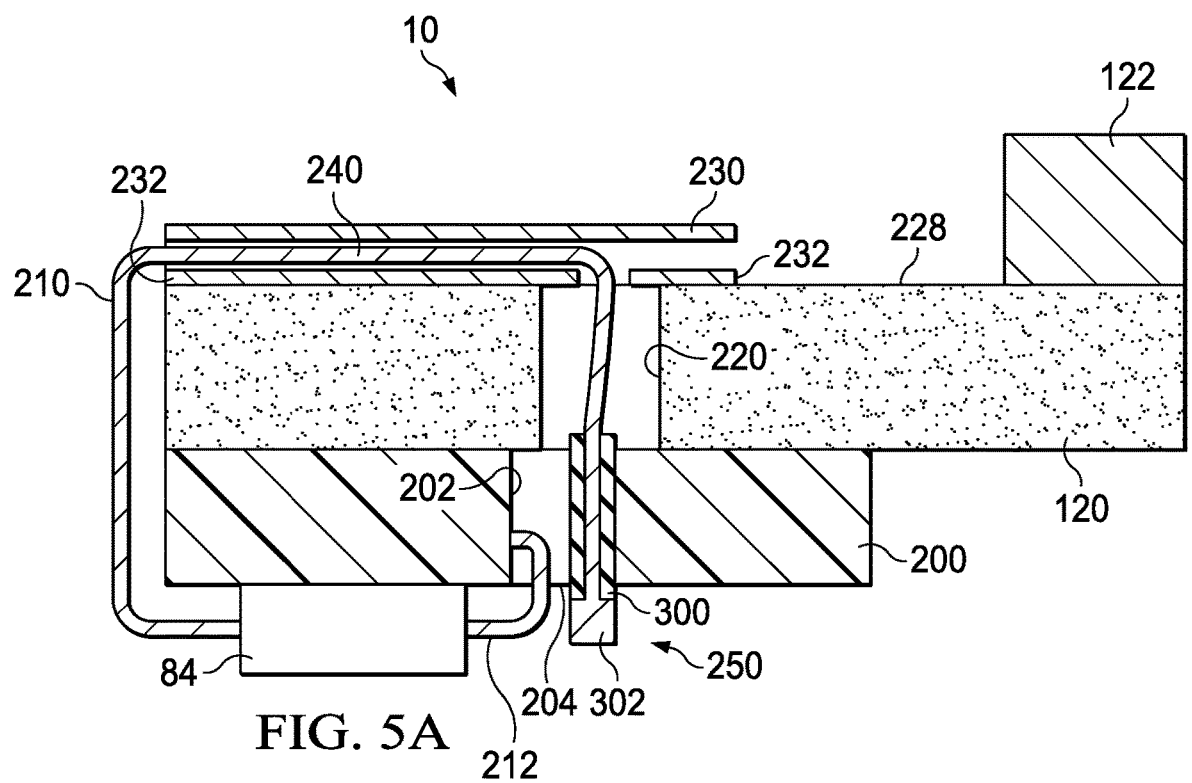
FIG. 5A is a diagram illustrating another embodiment of a temperature indicator in accordance with the present disclosure in an unactivated state.
Figure 5B:
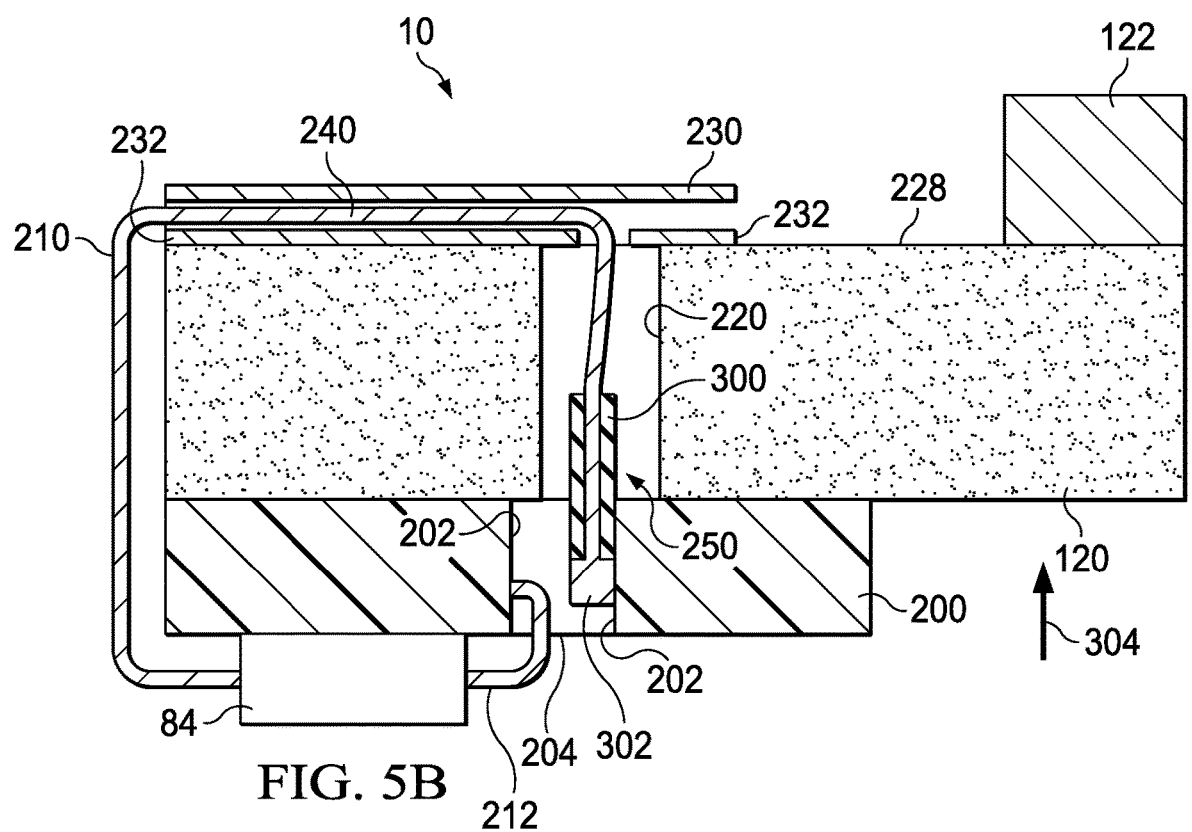
FIG. 5B is a diagram illustrating the temperature indicator of FIG. 5A in accordance with the present disclosure in an activated state.

FIGS. 5A and 5B are diagrams illustrating another embodiment of temperature indicator 10 in accordance with the present disclosure. FIG. 5A is a diagram illustrating an embodiment of indicator 10 in accordance with the present disclosure prior to activation (e.g., prior to detecting a particular temperature or time-temperature event), and FIG. 5B is a diagram illustrating an embodiment of indicator 10 in accordance with the present disclosure after activation (e.g., after detecting a particular temperature or time-temperature event). The embodiment of indicator 10 depicted in FIGS. 5A and 5B is similar in most respects to indicator 10 depicted and described in connection with FIGS. 4A and 4B except that in FIGS. 4A and 4B, circuitry 81 is initially in a closed circuit condition in an unactivated state of indicator 10 and in an open circuit condition in an activated state on indicator 10. In FIGS. 5A and 5B, an embodiment of indictor 10 is depicted where circuitry 81 is initially in an open circuit condition in an unactivated state of indicator 10 and in a closed circuit condition in an activated state on indicator 10. For example, in the embodiment illustrated in FIGS. 5A and 5B, end 250 of switch element 210 includes a non-conductive shielding 300 extending along a portion thereof prior to reaching a distal location of end 250. At the distal location of end 250, there is a lack of shielding 300 and/or conductive segment 302.

Thus, as illustrated in FIG. 5A, in an unactivated state of indicator 10, end 250 of switch element 210 is disposed within via 204 and extends at least partially therethrough such that shielding 300 is disposed against contact 202 within via 204 and segment 302 is located beyond or outside via 204, thereby resulting in segment 302 disposed in a spaced apart relation from contact 202 and in a lack of conductive contact with contact 202. However, referring to FIG. 5B, in response to a time-temperature parameter activating indicator 10, thereby causing substance 122 to melt and element 120 to expand/swell, end 250 of switch element 210 is drawn through via 204 in the direction indicated by arrow 304 relative to member 200 such that conductive segment 302 engages contact 202, thereby resulting in a closed circuit condition of circuitry 81. Thus, it should be understood that embodiments of indicator 10 may be configured to initially be in either a closed circuit or open circuit state that changes based on an activation of indicator 10.

Thus, embodiments of the present disclosure enable temperature and/or time-temperature event detection using a temperature indicator having a small footprint using a temperature-sensitive assembly with a passive RFID tag that gives a different reading depending upon the status of the temperature switch circuitry. Because the RFID tag is passive, the temperature indicator does not need a battery or other external power source. Further, the configuration of the temperature indictor enables the temperature indicator to be irreversible once activated (or subjected to a sufficient magnitude and/or time of temperature event). Additionally, the temperature indicator of the present disclosure may be configured with a single or multiple indication mechanisms (e.g., with window 22 where indicator 10 provides a visual indication of activation, with a combination of window 22 and with an RFID transmitted value indicating the activation status, or with an RFID transmitted value without window 22).

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The embodiment was chosen and described in order to best explain the principles of the disclosure and the practical application, and to enable others of ordinary skill in the art to understand the disclosure for various embodiments with various modifications as are suited to the particular use contemplated.

What is claimed is:

1. A temperature indicator, comprising:
   a housing having a detection assembly, the detection assembly including:
      first and second elements; and
      circuitry configured to detect whether the first element is in an open circuit condition or a closed circuit condition relative to a contact; and
   wherein responsive to the indicator being subjected to a temperature exceeding a threshold, the second element changes in a size thereof to cause a change in engagement between the first element and the contact, and wherein the circuitry is configured to output a value based on whether the first element and the contact are in the open circuit condition or the closed circuit condition.

2. The temperature indicator of claim 1, wherein the temperature detection assembly includes a substance configured to melt in response to the temperature exceeding the threshold.

3. The temperature indicator of claim 2, wherein the second element is configured to absorb at least a portion of the melted substance.

4. The temperature indicator of claim 1, wherein the circuitry is configured to output a first value in the open circuit condition and a second value in the closed circuit condition.

5. The temperature indicator of claim 1, further comprising a barrier disposed adjacent the second element, the barrier removable from being adjacent the second element to enable the second element to respond to the temperature exceeding the threshold.

6. The temperature indicator of claim 2, further comprising a barrier disposed between the second element and the substance, the barrier removable from being between the second element and the substance to enable the second element to respond to the temperature exceeding the threshold.

7. The temperature indicator of claim 1, wherein the change in the engagement results from the first element moving from a first position to a second position, and wherein the detection assembly in configured to prevent the first element from returning to the first position from the second position.

8. A temperature indicator, comprising:
a housing affixable to an object, the housing having:
a contact;
a first element movable relative to the contact;
a second element configured to cause the first element to move relative to the contact; and
circuitry configured to detect an engagement condition of the first element relative to the contact; and
wherein responsive to the indicator being subjected to a temperature exceeding a threshold, the second element changes in size to thereby cause movement of the first element relative to the contact to change the engagement condition between the first element and the contact, and wherein the circuitry is configured to output a value based on the engagement condition.

9. The temperature indicator of claim 8, wherein the contact and the first element are electrically conductive.

10. The temperature indicator of claim 8, wherein the circuitry is configured to output a first value when the first element is in engagement with the contact and a output a second value when the first element is disengaged from the contact.

11. The temperature indicator of claim 8, wherein the second element is configured to absorb at least a portion of a substance to change the size.

12. The temperature indicator of claim 8, wherein the change in the engagement condition results from the first element moving from a first position to a second position, and wherein the first element is prevented from returning to the first position from the second position.

13. A temperature indicator, comprising:
a contact;
a first element movable from a first position to a second position relative to the contact;
circuitry coupled to the first element and the contact, the circuitry configured to detect whether the first element and the contact are in an open circuit condition or a closed circuit condition; and
a second element configured to change in a size thereof to cause movement of the first element from the first position to the second position in response to the indicator being subjected to a particular temperature, the first element prevented from returning from the second position to the first position.

14. The temperature indicator of claim 13, wherein the second element is configured to absorb at least a portion of a substance to change the size.

15. The temperature indicator of claim 14, further comprising a barrier disposed between the second element and the substance, the barrier removable from being between the second element and the substance to enable the second element to respond to the particular temperature.

16. The temperature indicator of claim 13, wherein the second element is an absorbent element.

17. The temperature indicator of claim 14, further comprising a barrier element disposed between the substance and the second element to prevent migration of the substance into the second element.

18. The temperature indicator of claim 13, wherein the circuitry is configured to output an indication of the open circuit condition.

19. The temperature indicator of claim 13, wherein the first element is configured to maintain either the open circuit condition or the closed circuit condition in response to the movement.

20. The temperature indicator of claim 13, wherein the circuitry is configured to output an indication of the closed circuit condition.

* * * * *